United States Patent [19]

Arnold et al.

[11] 4,174,726
[45] Nov. 20, 1979

[54] PRESSURE BALANCING VALVE

[75] Inventors: Don C. Arnold, Palatine; Julio D. Silletti, Rockford; Richard L. Ritzenthaler, Alden, all of Ill.; Thomas J. Wilcox, East Troy, Wis.

[73] Assignee: Elkay Manufacturing Company, Broadview, Ill.

[21] Appl. No.: 739,082

[22] Filed: Nov. 5, 1976

[51] Int. Cl.² ............................................. C05D 11/00
[52] U.S. Cl. ..................................... 137/100; 251/57
[58] Field of Search ................. 137/98, 100; 251/57; 92/8; 60/571, 593

[56] References Cited

U.S. PATENT DOCUMENTS

| 404,472 | 6/1889 | Dunn | 60/571 |
|---|---|---|---|
| 1,659,354 | 2/1928 | Earl | 251/57 |
| 2,313,797 | 3/1943 | Bailey | 137/100 |
| 2,702,561 | 2/1955 | Geffroy | 137/98 |
| 2,849,015 | 8/1958 | Colson | 137/98 |
| 3,116,748 | 1/1964 | Wasson | 137/98 |
| 3,324,872 | 6/1967 | Cloud | 137/98 |
| 3,662,773 | 5/1972 | Nicolas | 137/100 |
| 3,724,480 | 4/1973 | Povalski et al. | 137/98 |
| 3,921,659 | 11/1975 | Rudewick | 137/98 |

FOREIGN PATENT DOCUMENTS

| 693232 | 8/1964 | Canada | 137/98 |
|---|---|---|---|
| 86117 | 8/1895 | Fed. Rep. of Germany | 137/100 |
| 303993 | 12/1932 | Italy | 137/100 |
| 325753 | 5/1929 | United Kingdom | 137/98 |

*Primary Examiner*—William R. Cline
*Assistant Examiner*—H. JaY Spiegel
*Attorney, Agent, or Firm*—Leydig, Voit, Osann, Mayer & Holt, Ltd.

[57] ABSTRACT

A valve assembly for use in building water systems where a hot and cold water supply line pressures vary, and having separate valve means for regulating the hot and cold water pressures. Independently mounted pressure equalizing means operated by the supply water pressures are connected to operate each of the valve means responsive to any pressure differential caused by changes in the supply pressures, to change the water pressure regulated by each of the valve means, with the magnitude and sense of the change reducing any such differential to zero and equalizing the pressures. The separate valve means and pressure equalizing means are contained in a cartridge having separate supply water chambers and hydraulic fluid chambers associated with each water chamber. A pair of movable walls are mounted in the cartridge each one separating one water chamber from the associated hydraulic fluid chamber, and the cartridge has restricted orifice means interconnecting the hydraulic fluid chambers to equalize the pressures therein while dampening movable wall oscillations due to changes in water chamber pressure. Each movable wall operates one of the valve means, so that the water pressure in one water chamber acts against one side of the movable wall and hydraulic fluid pressurized by the water pressure in the other water chamber acts against the other side of each movable wall.

5 Claims, 6 Drawing Figures

PRESSURE BALANCING VALVE

This invention relates to pressure equalizing valves of the anti-scald type used in dwellings and institutions, and providing hot and cold water at substantially equal pressures regardless of changes in pressure in one or both of the hot and cold water lines.

In the supply of water to baths and showers in homes, multiple unit dwellings and institutions, pressure equalizing valves have been provided to overcome the common problem of changes in water temperature at the shower heads or faucets due to pressure changes in the water lines resulting from usage at other outlets. The temperature of the water may jump to scalding temperature or drop to chilling temperature depending on whether the cold water or hot water pressure drops. Most pressure equalizing valves known heretofore may be generally classified as either spool-type shuttle valve devices or diaphragm-piston devices. Such devices typically utilize small control orifices to dampen the tendency of spool or diaphram to oscillate with sudden changes in pressure. A serious problem found with these devices in service is the partial plugging and liming of the control orifices from the impurities found in the normal water supply. Such partial plugging changes the size of the control orifices and reduces the effectiveness of their control function.

The principal object of this invention is to provide pressure equalizing valves of the type suitable particularly for shower, bath and like uses, which will maintain the effectiveness of their control function throughout their service life.

A related object of this invention is to provide pressure equalizing valves of this type having valves in the water lines operated by an equalizing mechanism which is sealed and separate from the water supply, so that the equalizing mechanism is not subjected to the corrosive action of the water or contamination and liming up due to foreign materials present in the normal water supply.

Another object is to provide pressure equalizing valves of this type which are in cartridge form and housed separate from mixing valve mechanisms, thus providing pressure equalizing valves which are usable with different types of mixing valves and are accessible for service independently of any associated mixing valve mechanism.

Another object is to provide pressure equalizing valves of this type which are in the form of a replaceable cartridge to facilitate service and repair.

Another object is to provide pressure equalizing valves of this type wherein the mechanism is unimpaired by long periods of inactivity.

Another object of the invention is to provide pressure equalizing valves of this type wherein the valve components located in the water lines and controlling the pressures of the hot and cold water are free of any frictional engagement with associated components in the operation of the valves, and, therefore, wear less and have longer life.

Another object is to provide pressure equalizing valves of this type which include flexible diaphragms in the mechanism and wherein a double guard against crossflow between the hot and cold water supplies is provided in the event of diaphragm failure.

Another object is to provide pressure equalizing valves of this type constructed with inexpensive materials and of inexpensive, molded and cast parts, yet providing valves having long, trouble-free service life.

FIG. 3 is a horizontal sectional view taken in the plane of line 3—3 in FIG. 1;

FIG. 5 is a plan view of one of the diaphragms included in the pressure equalizing valve assembly; and FIG. 6 is a sectional view of the diaphragm taken in the plane of lines 6—6 in FIG. 5.

Figure 1:
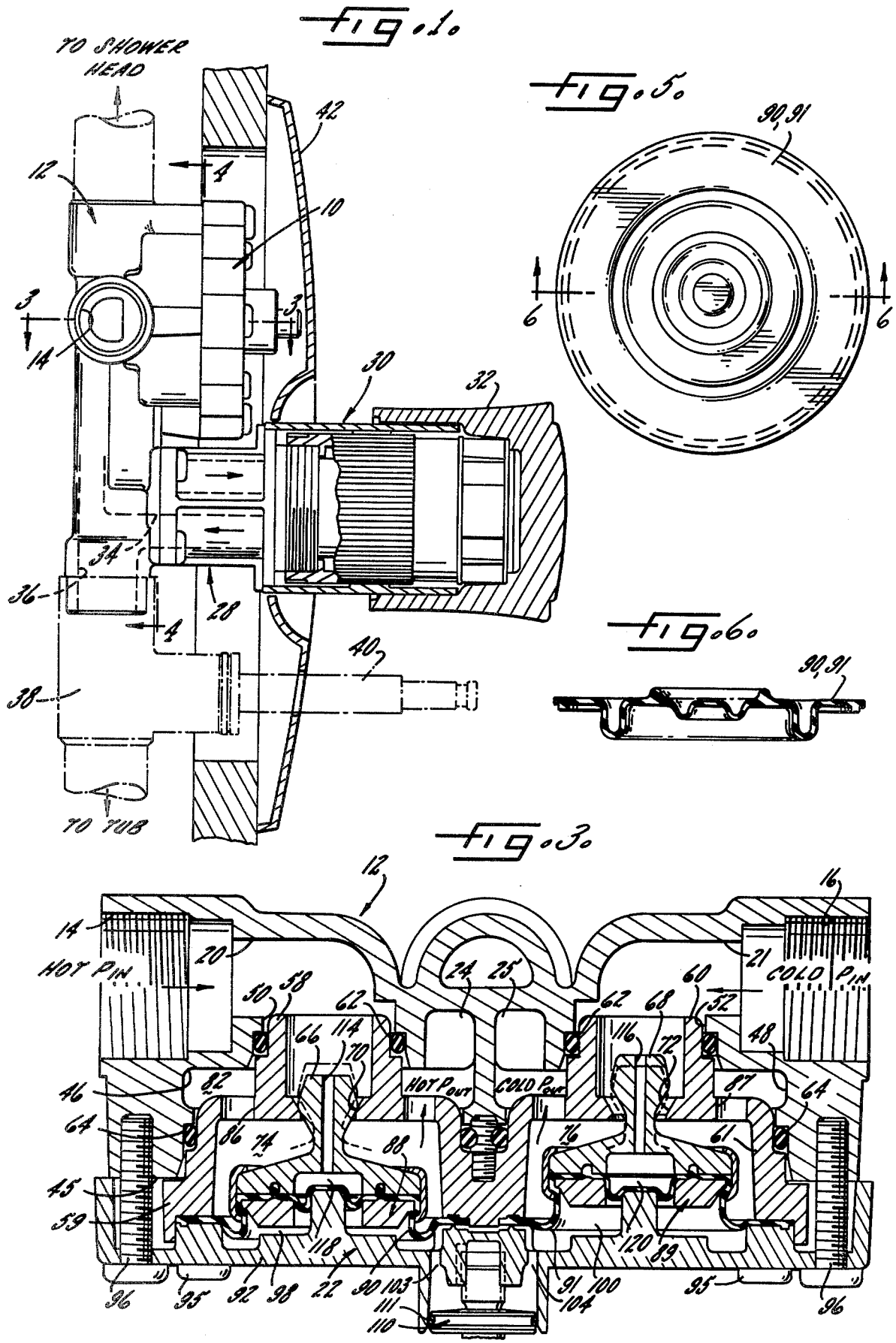
FIG. 1 is a vertical sectional view with parts in elevation showing our pressure equalizing valve cartridge mounted on a supply body, and with associated components connected in the water piping behind a wall.
Figure 2:
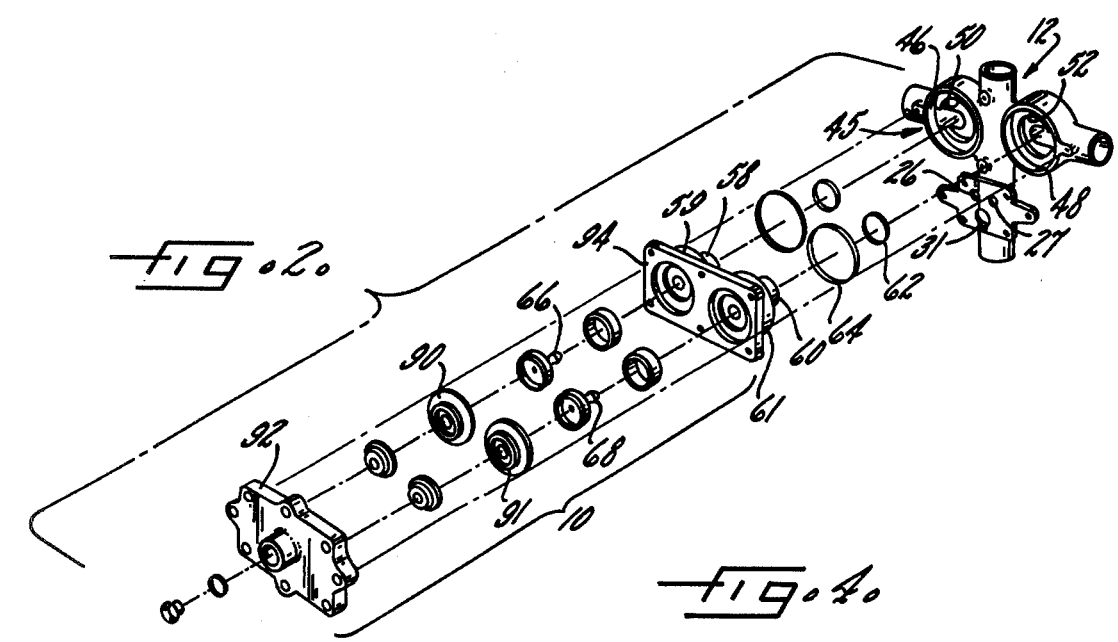
FIG. 2 is an exploded perspective view illustrating the parts of the pressure equalizing valve cartridge and supply body shown in FIG. 1.
Figure 4:
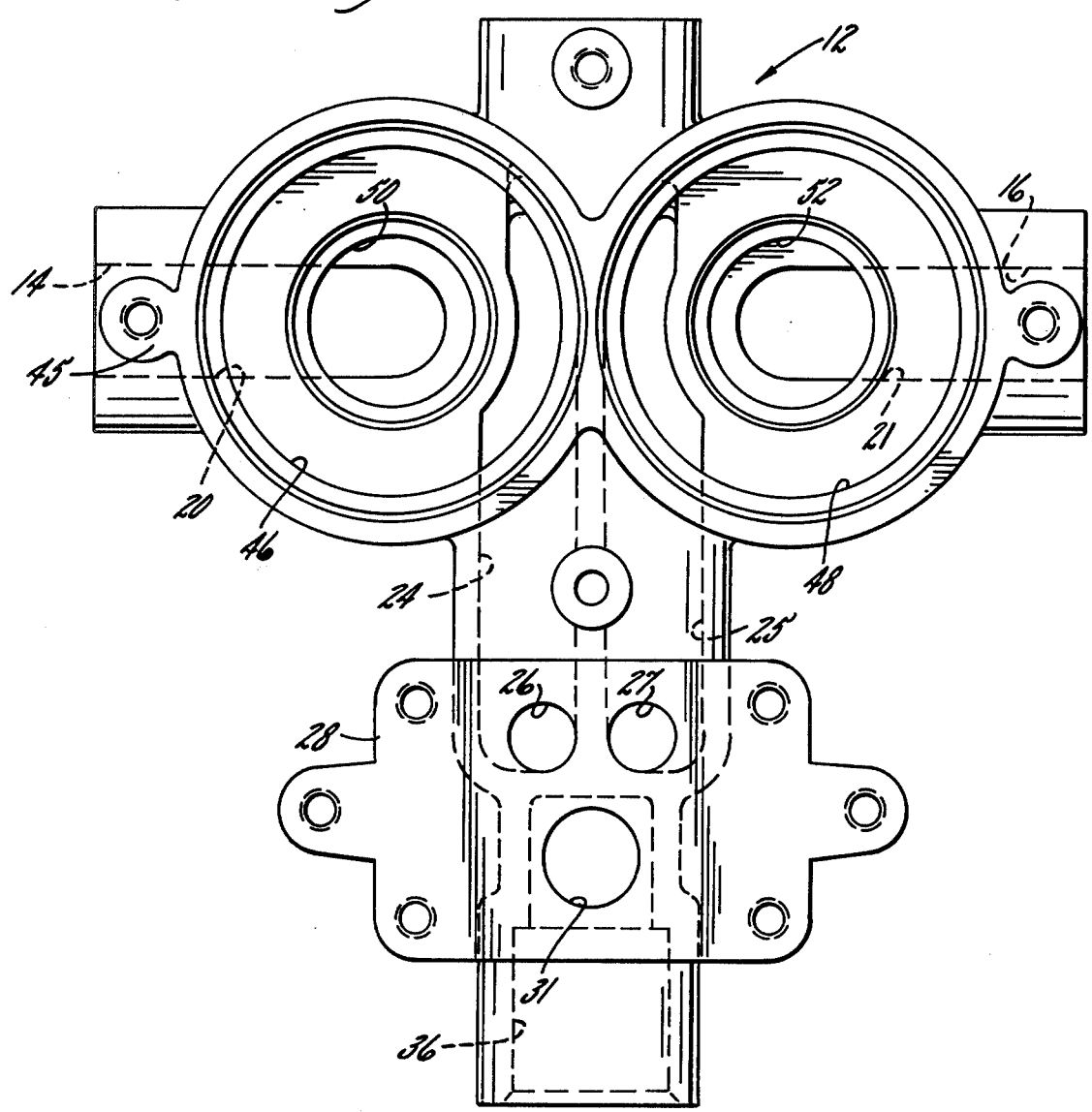
FIG. 4 is a view in front elevation of the supply body with the cartridge removed.

Referring to FIGS. 1-3, a pressure equalizing valve assembly constructed according to this invention is shown in the form of a cartridge 10 adapted to be mounted on a supply body 12 connected, for illustrative purposes, in the water piping behind a wall and between a tub and shower head. The supply body 12 has a hot water inlet 14 and a cold water inlet 16 for connection to the hot water supply and cold water supply pipes, respectively. Separate internal inlet passages 20, 21 within the supply body 12 connected to the supply body inlets 14 and 16 provide the hot and cold water at supply pressure to the cartridge 10 from which the hot and cold water is discharged back into the supply body 12 but now equalized in pressure by the pressure equalizing function served by a mechanism 22 embodied in the cartridge. Thus separate outlet passages 24, 25 in the supply body 12 receive the pressure equalized hot and cold water from the cartridge 10 and convey the water to supply ports 26, 27 and then through horizontal supply passages in a mounting fitting 28 for a conventional mixing valve assembly 30. After temperature and volume is set using the mixing valve, by operating its handle 32, the mixed water from the mixing valve is conveyed through a horizontal discharge passage 34 in the mounting fitting 28 and via a return port 31 to a generally vertical supply passage 36 in the supply body 12. To divert the mixed water from the supply passage 36 to the shower head or tub, as desired, a diverter assembly 38 is connected below the supply body 12 operable by a stem 40. It will be noted that the pressure equalizing valve assembly including the supply body 12 and cartridge 10 is accessible for service independently of the associated mixing valve 30, after removal of the escutcheon plate 42. The mixing valve 30 may be of any one of different types since it is mounted completely separate from the pressure equalizing valve assembly.

Now considering the detailed construction and mode of operation of the pressure equalizing valve assembly comprising the supply body 12 and the cartridge 10, the supply body 12 has a mounting surface 45 on its upper section for the cartridge 10 and has formed therein a pair of cylindrical cavities 46, 48, each having a coaxial cylindrical recess 50, 52 at the bottom of the cavity 46, 48. The inlet passages 20, 21 which extend laterally communicate the bottom recesses 50, 52 with the hot and cold water inlets 14, 16, respectively, and the supply body outlet passages 24, 25 extend from the cavities 46, 48, respectively. The cartridge 10 has paired concentric tubular inlet and outlet members 58, 59 and 60, 61 projecting forwardly with each said pair of inlet and outlet members extending into one of the supply body cavities 46, 48 when the cartridge is mounted on the mounting surface 45 of the supply body 12. The longer inner tubular members 58, 60 are received in sealed engagement with the cylindrical walls of the recesses 50, 52, O-rings 62 insuring the seal. Said inner tubular members 58, 60 provide for ingress of hot and cold water to the cartridge from the hot and cold water supplies. The shorter outer tubular members 59, 61 serve as outlet members from the cartridge, and are sealed by O-rings 64.

Pressure equalization is achieved by means of flow control valves 66, 68 movable relative to valve seats 70, 72, formed within the inlet members 58, 60. The flow control valves 66, 68 are operated by the pressure equalizing mechanism to control flow into water chambers 74, 76 in the cartridge 10 from the inlet member which receive hot and cold water at water supply pressures, and equalize the pressure in such chambers 74, 76 irregardless of changes in supply pressures. With the paired inlet and outlet members extending into each of the supply body cavities, annular chambers 82, 84 are formed in the supply body 12 between the outer surfaces of the inlet members 58, 60 of the cartridge and the walls of the cylindrical cavities 46, 48 in the supply body 12, which annular chambers 82, 84 communicate both with the water chambers 74, 76 in the cartridge (via outlet ports 86, 87), and the outlet passages 24, 25 in the supply body that lead vertically downwardly to the ports 26, 27 into the mounting fitting 28 for the mixing valve 30.

For operating the flow control valves 66, 68 relative to their valve seats so as to equalize the pressure in the water chambers 74, 76 and provide equal outlet pressures with unequal hot and cold water supply pressures, the cartridge has a mechanism 22 operated by hydraulic fluid sealed in chambers separate from the water in the cartridge water chambers 74, 76. The equalizing mechanism 22 includes a pair of movable walls 88, 89 each supported for axial movement by a diaphragm 90, 91 which is clamped at its edges between two components making up the cartridge, herein shown as a housing member 92 and a body member 94. The body member has formed thereon short tubular outlet members 59, 61 and long, tubular inlet members 58, 60 which fit in sealing engagement with the cylindrical cavities 46, 48 and bottom recesses 50, 52 in the supply body 12. The housing and body members 92, 94 of the cartridge 10 are fastened together by means herein shown as a machine screws 95 received in threaded openings in the body member 94. Mounting screws 96 are used for fastening the cartridge 10 to the supply body 12.

Each of the movable walls and diaphragms together with the adjacent section of the housing 92 provides a sealed chamber 98, 100 for hydraulic fluid such as light oil, which fills the two hydraulic fluid chambers 98, 100. To dampen oscillations of the movable walls upon changes in water pressure, the chambers 98, 100 are interconnected by restricted orifice means such that hydraulic fluid may pass from one chamber to the other at a restricted flow rate. The orifice means are provided by a set of openings 103, 104 in a thin wall 106 of the housing 92 which communicate with a common filling chamber 108. The filling chamber is normally sealed by a plug 110, and the hydraulic fluid is kept clean and the connecting orifices corrosion-free since the fluid is not contaminated by the water passing through the cartridge.

In carrying out the pressure equalization function served by the mechanism 22, as indicated in FIG. 3, with the cartridge 10 mounted on the supply body 12 in such an orientation that hot water is received at supply pressure (hot $P_{in}$) at one inlet member 58 to the cartridge 10 and cold water at supply pressure (cold $P_{in}$) at the other inlet member 60 to the cartridge, where these supply pressures are equal the flow control valves 66, 68 will be maintained by the movable walls 88, 89 in equally open position shown in phantom in FIG. 3. The pressures in the water chambers 74, 76 and outlet pressures (hot $P_{out}$ and $P_{out}$) of water through the outlet ports 86, 87, are equal with the regulating effect of the flow control valves 66, 68 being the same.

Upon a lowering in the cold water supply pressure, (cold $P_{in}$) due for example to the opening of one or more upstream outlets, with the hot water supply pressure (hot $P_{in}$) remaining high, the cold water pressure drops in the water chamber 76 on one side of the movable wall 89 and adjacent the control valve 68, causing the hydraulic fluid pressure in the fluid chamber 100 behind the movable wall 89 also to drop. The prevailing higher hydraulic fluid pressure in the chamber 98 behind the hot water movable wall 88 causes hydraulic fluid to be forced therefrom through the restricted orifice means 103, 104 into the fluid chamber 100 behind the movable wall 89, thereby moving the movable wall 89 and the control valve 68 toward the fully open position of the control valve 68 shown in solid lines in FIG. 3. Such movement of the cold water flow control valve 68 increases the pressure in the cold water chamber 76. The fluid pressure in the hydraulic chamber 98 lowers upon such flow which creates a differential pressure across the hot water movable wall 88 causing it to retract and draw the hot water pressure control valve 66 towards its seat 70. This has the effect of throttling the flow of hot water past the valve seat 70 into the hot water chamber 74 and reducing the hot water pressure in that chamber. Since the two hydraulic fluid chambers 98, 100 are in communication through the orifice means 103, 104, the pressures in these two chambers will equalize and bring into equilibrium the pressures in the water chambers 74, 76, due to the operation of both valves 66, 68.

While the foregoing explanation of operation assumes a drop in cold water pressure, it will be understood that the operation is similar in the event of drop in hot water supply pressure, but with the throttling effect being increased at the cold water flow control valve 68 rather than the hot water valve 66, and the hot water valve 66 being moved to a more fully open position to decrease any throttling effect. Moreover, essentially the same mode of operation will take place in the event of increase in pressure of one or the other of the hot or cold water supplies, to increase the throttling of the higher pressure supply and decrease the throttling of the lower pressure supply, to equalize the outlet pressures. This equalization function is accomplished by a mechanism which has no close fitting sliding valves or seals which introduce frictional losses and leakage problems.

Since the hot and cold water supply pressures act directly against the heads of the flow control valves 66, 68, respectively, these valves 66, 68 are individually constructed as balanced valves so that they are not affected in their operation by changes in water supply pressure. For this purpose, passages 114, 116 are formed in the valves which lead to balancing chambers 118, 120 in the movable walls 88, 89. The diameters of these balancing chambers 118, 120 are substantially equal to the diameters of the valve seats 70, 72, so as to reduce to essentially zero the effective areas of the valves 66, 68, exposed to water supply pressure and thereby cancel the direct effect in the operation of both valves of changes in the water supply pressure.

The cartridge 10 and supply body 12, and the valve assembly components included therein may be constructed with inexpensive materials and of inexpensive, molded and cast parts, yet because of features of the valve assembly construction it will have long, trouble-free service life. For example, while the valves 66, 68 are located in the inlet members 58, 60 and thus in the water lines, the valves are free of any frictional engagement with associated components and moved directly into and out of engagement with their valve seats 70, 72 in the operation of the valves, such that they wear less and have longer life. It will also be observed that with the movable walls 88, 89 for operating the valves 66, 68 being independently mounted as shown, and independently supported by their own diaphragms 90, 91, the diaphragms provide a double guard against cross flow between the hot and cold water supplies in the event of diaphragm failure. In the event of diaphragm failure, because the valve is in cartridge form and housed separate from the mixing valve mechanism, the cartridge may easily be entirely replaced without disturbing the mixing valve. Providing the valve of this invention in the form of a replaceable cartridge facilitates service and repair. While service and repair is facilitated, because the equalizing mechanism embodies a sealed hydraulic fluid assembly, it will be unimpaired by long periods of inactivity. The problem frequently encountered with prior devices in service is the partial plugging and liming of the control orifices from the impurities found in the normal water supply. Such partial plugging changes the size of the control orifices and reduces the effectiveness of their control function. Because the control orifices in the pressure equalizing mechanism of this invention are located in the hydraulic fluid assembly and not in the water, they will maintain the effectiveness of their control function throughout the service life of the valve assembly.

It will be observed that the hydraulic fluid assembly includes a threaded plug 110 which, together with the sealing O ring 111, may be moved inward or backed outward from the position shown in FIG. 3, thus providing means for adjusting the volume of overall water flow through the equalizing valve assembly. By moving the plug 110 inward, hydraulic fluid in the chamber 108 adjacent the plug is transferred through the orifices 103, 104 into the main hydraulic fluid chambers 98, 100. This will result in movement of the movable walls 88, 89 and the valves 66, 68 carried thereby in a direction to move the valves 66, 68 away from their respective seats 70, 72 to allow greater flow past the valves. Conversely, by backing out the threaded plug 110 the valves 66, 68 will be set closer to their respective seats 70, 72 resulting in an overall decrease in the volume of flow through the assembly. Means for adjustment of volume of flow is thus provided which may be carried out when the equalizing valve assembly is installed, or at a later time, thereby enhancing the usefulness of the assembly.

It should also be clear that the two valves 66, 68 and movable walls 88, 89 serving the hot water line and cold water line respectively, are mechanically separated but hydraulically interconnected. While a unitary housing means 92 is shown for both valves and their associated components, that is a matter of design choice and the housing means may be formed of separate members, with the hydraulic interconnection lengthened or altered in accordance with the design geometry. The invention makes feasible these and other modifications, as will appear to a man skilled in the art, all within the spirit and scope of the appended claims.

We claim:

1. A pressure equalizing valve means comprising:
    housing means providing hot and cold water inlet members,
    valve means in each said inlet member,
    a water chamber within said housing means associated with each said valve means and inlet member, each said valve means controlling flow of water received at one of said inlet members at supply pressure and regulating the pressure in the associated water chamber,
    an outlet member for each water chamber,
    said housing means having pressure equalizing means operated by the water pressure in both said water chambers and connected to operate each said valve means responsive to any pressure differential between said water chambers caused by changes in the supply pressure in either said inlet member, said pressure equalizing means including means in said housing means defining two hydraulic fluid chambers associated respectively with said water chambers, a pair of movable walls, one of said movable walls being mounted between each of said associated chambers and connected to said valve means, means including a restricted fluid passage between said hydraulic fluid chambers for transmitting hydraulically the movement of one movable wall, responsive to a change in pressure in the associated water chamber, to the other movable wall and inversely shifting the position of both valve means, to change the water chamber pressure regulated by each said valve means, with the magnitude and sense of the change reducing any such differential to zero and equalizing the pressures in said water chambers thereby to provide equal pressures from said outlet passage means with unequal water supply pressures, said two hydraulic fluid chambers and fluid passage between being sealed from the water supply and having a separate body of hydraulic fluid therein,
    said valve means in each said inlet member comprising a valve seat, a valve member movable relative to each said valve seat, an element connecting each said valve member to one of said movable walls, and means for balancing each said valve member against changes in water supply pressure comprising a balancing chamber formed in said one movable wall, and passage means through said connecting element section between said balancing chamber and the inlet member, the diameter of said balancing chamber being substantially equal to the diameter of the valve seat so that the effective area of the valve member is substantially zero.

2. A pressure equalizing valve means according to claim 1 further comprising means for acting on said body of hydraulic fluid to adjust the volume of overall water flow through said valve means from said inlet members to said outlet members.

3. A pressure equalizing valve assembly comprising:
    a supply body having a mounting surface with separate hot and cold water cavities therein, a cartridge fastened to said supply body on said mounting surface, said cartridge having a pair of concentric tubular members projecting from said cartridge providing paired inlet and outlet members extending into each said supply body cavity, the inner of said tubular members in each pair projecting further from said cartridge than the outer of said paired members, said inner tubular members serving as inlet members and said outer tubular members serving as outlet members, said supply body having bottom recesses in each said cavity to receive said inlet members, inlet passage means in said supply body for providing water at supply pressure to each said cavity and said inlet member therein, said cartridge having a water chamber formed within the cartridge associated with each said inlet member, outlet passage means in said cartridge provided by said outlet members and in said supply body, leading from said water chambers and passing through said cavities, said cartridge having valve means in each said inlet member for controlling flow of water therefrom into the associated water chamber and regulating the water pressure therein, said cartridge having pressure equalizing means operated by the water pressure in both said water chambers and connected to operate said valve means responsive to any pressure differential between said water chambers caused by changes in the supply pressure in either said inlet member, said pressure equalizing means including means in said cartridge defining two hydraulic chambers associated respectively with said water chambers, a pair of movable walls, one of said movable walls being mounted between each of said associated chambers and connected to said valve means, means including a restricted fluid passage between said hydraulic chambers for transmitting hydraulically the movement of one movable wall, responsive to a change in pressure in the associated water chamber, to the other movable wall and inversely shifting the position of both valve means, to change the water chamber pressure regulated by each said valve means, with the magnitude and sense of the change reducing any such differential to zero and equalizing the pressures in said water chambers, said valve means in each said inlet member comprising a valve seat, a valve member movable relative to each said valve seat, an element connecting each said valve member to one of said movable walls, and means for balancing each said valve member against changes in water supply pressure comprising a balancing chamber formed in said one movable wall, and passage means through said connecting element section between said balancing chamber and the inlet member, the diameter of said balancing chamber being substantially equal to the diameter of the valve seat so that the effective area of the valve member is substantially zero.

4. A pressure equalizing valve assembly comprising:

a supply body having a mounting surface with separate hot and cold water cavities therein, a cartridge fastened to said supply body on said mounting surface, said cartridge having an inlet member extending into each said supply body cavity, inlet passage means in said supply body for providing water at supply pressure to each said cavity and said inlet member therein, said cartridge having a water chamber formed within the cartridge associated with each said inlet member, outlet passage means in said cartridge and said supply body leading from each said water chamber, said cartridge having valve means in each said inlet member for controlling flow of water therefrom into the associated water chamber and regulating the water pressure therein, said cartridge having pressure equalizing means operated by the water pressure in both said water chambers and connected to operate said valve means responsive to any pressure differential between said water chambers caused by changes in the supply pressure in either said inlet member, said pressure equalizing means including means in said cartridge defining two hydraulic chambers associated respectively with said water chambers, a pair of movable walls, one of said movable walls being mounted between each of said associated chambers and connected to said valve means, means including a restricted fluid passage between said hydraulic chambers for transmitting hydraulically the movement of one movable wall, responsive to a change in pressure in the associated water chamber, to the other movable wall and inversely shifting the position of both valve means, to change the water chamber pressure regulated by each said valve means, with the magnitude and sense of the change reducing any such differential to zero and equalizing the pressures in said water chambers.

5. A pressure equalizing valve assembly according to claim 4 wherein said hydraulic chambers of said pressure equalizing means interconnected by said restricted fluid passage are sealed and filled with fluid and further comprising means for acting on said fluid to adjust the volume of overall water flow through said valve assembly between said inlet passage means and said outlet passage means.

* * * * *